United States Patent [19]
Robinson

[11] 3,944,194
[45] Mar. 16, 1976

[54] METAL CUTTING TOOL GUIDE

[76] Inventor: Lawrence V. Robinson, 2323 Mesquite Ave., Las Vegas, Nev. 89101

[22] Filed: Feb. 21, 1974

[21] Appl. No.: 444,305

[52] U.S. Cl............... 266/23 E; 33/21 C; 266/23 F; 266/23 L; 269/8
[51] Int. Cl.$^2$......................................... B23K 7/10
[58] Field of Search..... 266/23 R, 23 B, 23 E, 23 F, 266/23 HH, 23 L, 23 M, 23 N; 269/1, 8; 148/9, 9.6; 33/21 C, 27 K, 30 B, 174 B

[56] References Cited
UNITED STATES PATENTS

| | | | |
|---|---|---|---|
| 1,462,101 | 7/1923 | Colson | 269/8 |
| 1,668,085 | 5/1928 | Orzel | 266/23 L |
| 1,668,086 | 5/1928 | Orzel | 266/23 L |
| 2,424,286 | 7/1947 | Robbins | 33/DIG. 1 |
| 2,448,089 | 8/1948 | Duvall | 266/23 N |
| 2,659,972 | 11/1953 | Norris | 33/DIG. 1 |
| 2,781,582 | 2/1957 | Würsch | 33/DIG. 1 |
| 2,832,139 | 4/1958 | Ayres | 33/21 C |
| 3,000,098 | 9/1961 | Holder | 33/21 C |
| 3,033,144 | 5/1962 | Schmidt | 269/8 |
| 3,785,631 | 1/1974 | Pyre | 266/23 L X |
| 3,835,541 | 9/1974 | Whitworth | 33/21 C |

Primary Examiner—Roy Lake
Assistant Examiner—Paul A. Bell
Attorney, Agent, or Firm—Jerry R. Seiler

[57] ABSTRACT

An improved device for guiding a cutting torch on a metal surface which metal is a magnet attracting material comprises a magnetized base member and one or more guide members secured to the base member which guide members act as a template having a shaped surface for guiding the cutting torch. The device is provided with means for securing one of the guide members adjacent the edge of the base member and preferably means for holding or securing a plurality of additional guide members having different shapes or of different sizes when not in use. In a second embodiment, an assembly includes a support for holding the device of the invention on a pipe or other surface of revolution.

13 Claims, 3 Drawing Figures

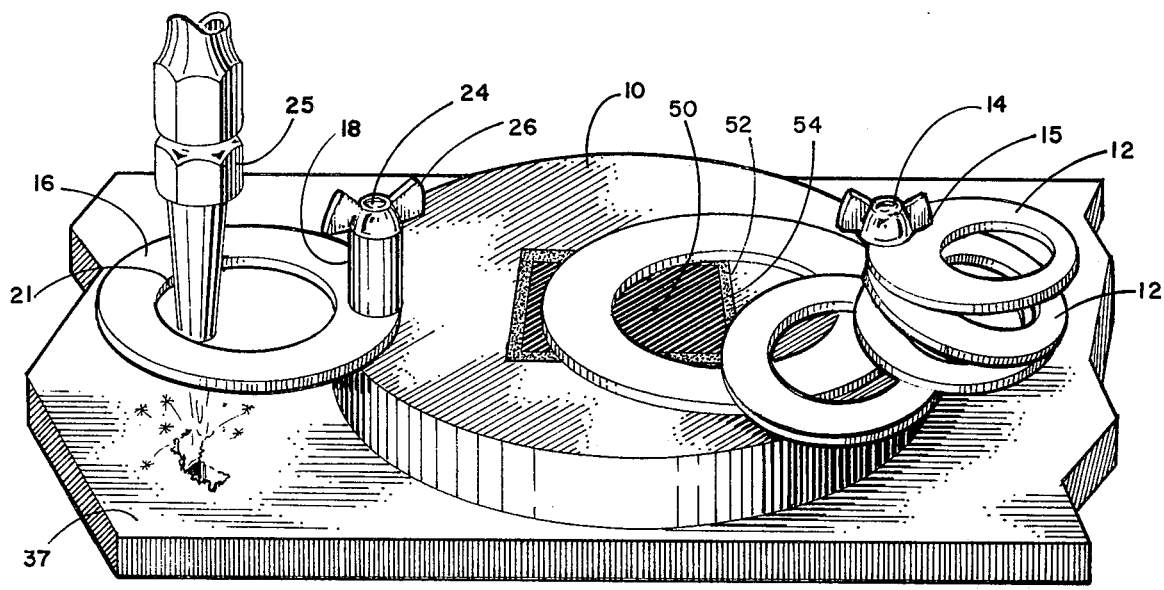
FIGURE 1.
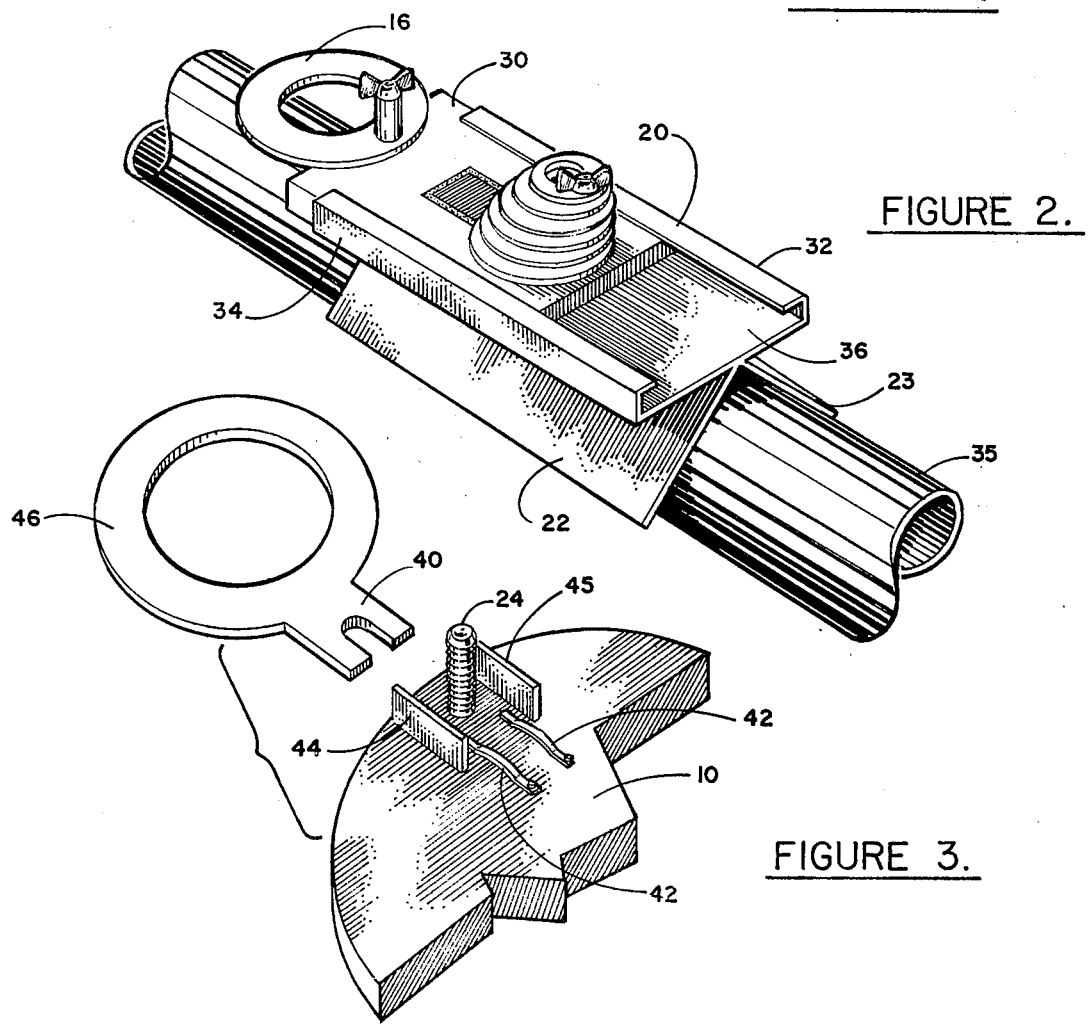
FIGURE 2.
FIGURE 3.

3,944,194

METAL CUTTING TOOL GUIDE

BACKGROUND OF THE INVENTION

The use of hole cutting guides or templates for guiding cutting tools such as acetylene torches and the like on metal pipes is known in the art. For example, U.S. Pat. No. 1,668,086 discloses an apparatus for holding a template for guiding cutting torch on a metal plate. However, the apparatus shown in the patent incorporates a heavy handle and stand having a relatively small projecting ledge on which a template is mounted for guiding the cutting torch. Although the apparatus is disclosed as being moved manually, its heavy weight is necessary in order to allow it not to be readily disturbed during manipulation of the cutting torch. Thus, unless the handle and overall weight of the device are sufficient or unless the operator is required to hold the handle steady during the cutting operation, it may become inadvertently displaced by slipping on a metal surface thereby interrupting the cutting operation and resulting in an undesirable and untrue cut. Moreover, the device disclosed does not offer any means for holding a template on a pipe or surface of revolution. Thus, the apparatus disclosed by way of example of state of the art devices is unnecessarily heavy, cumbersome and bulky because of its dimensional characteristics making it somewhat impractical.

SUMMARY OF THE INVENTION

In order to obviate problems with prior template apparatus having a template for guiding a cutting torch on a metal plate, it is an object of the invention to provide a simple, yet reliable and practical device for such a purpose. It is also the object of the invention to provide a guide member holding device which is lightweight and which yet can be put on a magnetic attracting metal plate and which will allow an operator to guide the cutting torch with the template without easily being inadvertently moved during the cutting operation. It is also an object of the invention to provide a device on which means are secured for holding both a template in use and means for holding a plurality of additional templates of different shapes or sizes not in use but readily accessible. It is also an object of the invention to provide a template holding assembly which can be used on a pipe or surface of revolution.

The device of the invention for achieving the stated objects comprises a magnetized base member or one which has a magnet attached or embedded therein which base member has a flat surface for resting on a metal plate which is to be cut by a cutting tool. Attached to the upper surface of the base member are means for securing a template for guiding the cutting tool and means for securing a plurality of additional or extra templates having various shapes and sizes. In another embodiment the invention comprises an assembly including a support for holding the base member on a pipe or other surface of revolution. Characteristics of the device and its use will be evident from the following detailed description.

BRIEF DESCRIPTION OF THE DRAWINGS

FIG. 1 is a perspective view illustrating the device of the invention magnetically secured on a plate;

FIG. 2 illustrates the device similar to FIG. 1 and a support for use on a pipe; and FIG. 3 is a perspective view illustrating another embodiment of the invention.

DETAILED DESCRIPTION OF THE INVENTION

Observing FIG. 1, the device of the invention comprises a magnetized base member 10 which is shown as a disc shaped base although it should be appreciated that the shape of the periphery of the base is not particularly critical. Thus, the base member 10 may be round or disc shaped as shown, square, rectangular, five or six sided, octangonal or the like as desired. The thickness of the base member is not particularly important so long as it is magnetized or has a magnet secured thereto or embedded therein. The purpose of the magnetized feature is so that when the device is rested or placed on a metal sheet or other metal surface to be cut by a cutting torch or the like, the base member will be magnetically attracted to the metal sheet and will remain at a single position during the cutting operation without being easily or inadvertently moved. Of course the ease of movement will depend somewhat on the strength of the magnet in the base member. Thus, the magnet secured to or embedded in the base should be of a permanent type so that it can be used over relatively long periods without loss of its magnetic properties. It will also be understood that the usefulness of the base and accordingly the feature of the invention will require its use on a magnet attracting metal surface or normally one containing iron such as steel or other ferrous metals and alloys.

The base member preferably has a flat lower surface so that it can rest firmly upon a flat metal sheet which is to be cut, will resist movement due to slight pressures of the cutting torch on the template and when resting on an inclined metal surface, and yet which can be moved by an operator by hand when he wishes to slide it on the surface to another location.

The base member is also provided with means for securing a guide member or template 16 for guiding a metal workpiece 37 as shown. Accordingly, for this purpose and by way of example, a post 24 is attached to the upper surface of base member 10 near or adjacent an edge. It will be understood that the template will have a hole or orifice through it so that it can be placed on the post 24 and then secured. Preferably, and as shown, post 24 is provided with threads, at least adjacent its upper end so that a wing nut 26 or similar member can threadedly engage the post and thus secure template 16 tightly to base member 10. For this purpose, a sleeve 18 may also be used on the post between the wing nut and the template so that by tightening the nut, pressure is exerted on sleeve 18 and in turn template 16 is wedged between the lower end of the sleeve and the upper surface of the base member. However, such a means for securing the template is way of example only and other equivalent means evident to those skilled in the art and within the purview of this invention may also be used.

Another preferred feature of the invention comprises a second means provided on base member 10 for securing one or more extra templates 12 as shown. Such additional templates being readily available on the device will be appreciated. For this purpose threaded post 14 is attached to the upper surface of base member 10 opposite post 24. Wing nut 15 for tightening the additional templates 12 on the base is provided. These additional templates may be of any size or shape and incorporate a hole therethrough for attachment on post 14 and easily removed when desired and yet firmly held so as not to interfere with the template being used.

By way of example, another embodiment providing for a quick disconnect type of template is shown in FIG. 3. Template 46 includes a bracket 40 attached thereto which bracket has an elongated notch for engaging post 24 which may be threaded as shown. On each side of the post are guides 44 and 45, secured to the surface of base member 10, which guides form a channel for bracket 40 and prevent the template from significant lateral movement when the bracket notch engages post 24. The template can be further secured by a wing nut on the post as previously explained, or spring clips 42 attached to the base member may be incorporated for securing bracket 40 against the base member. Again however, such features are by way of illustration only and the invention is not intended to be so limited.

The embodiment shown in FIG. 1 can be readily used by an operator by simply selecting the template having the shape or size of guide surface 21 to be used to guide the cutting torch 25. The base member 10 is simply placed on the ferrous metal surface 37 to be cut, the proper template selected and secured onto post 24 and tightened down. The operator then simply uses the template to guide the cutting tool or acetylene torch 25. It will be noted that the device as shown is compact, can be lightweight and thus easily stored in a tool case with all the necessary templates attached thereto and at the same time, because of its magnetized base member, is maintained on a ferrous metal surface and not be easily dislodged during the cutting operation.

FIG. 2 illustrates another embodiment of the invention whereby the cutting tool guide device of the invention can be used on a surface of revolution such as pipe 35 as shown. For this purpose, in addition to the template holding base member and attachments previously described and shown in FIG. 1, a support member 20 is provided. The support includes a supporting plate 36, preferably having a flat upper surface and a pair of opposite sides 34 which extend upwardly and normal to the plane of the flat plate 36, and which sides have a pair of inwardly extending upper flanges 32. Thus, between the flat upper surface of the plate 36 and the flanges there are provided a pair of channels into which base member 30 can be secured. In addition, the support member includes a pair of rigid and preferably straight legs 22 and 23 which are attached to the bottom of plate 36 and which extend downwardly therefrom. The legs have an angle therebetween so that they can be placed on a surface of revolution such as pipe 35 during the cutting operation. For most surfaces of revolution an angle between the two legs 22 and 23 of between about 30° and about 150° is suitable, that being shown being about 90° which will be useful for most pipes.

Although a rectangular base member 30 is shown in this embodiment, its shape is not critical so long as its width will allow it to fit within the channels between flanges 32 and upper plate surface 36 of the support member as shown. The base member can be placed on the support member and will remain in place thereon during the cutting operation. The support member should preferably also be of as magnetizable material so that the base member can be slipped into the channels onto the support member and will be maintained in that position without being held by an operator during the cutting operation. Once the template 16 is secured in the proper position past the forward edge of support member plate 36, the operator may then use the interior surface of the guide member to guide the cutting tool for cutting a hole or orifice in pipe 35. The support member may also include a level placed across the flanges 32 or on the upper plate surface, preferably at the end opposite from that on which template 16 extends. With such an embodiment, the base member will be required to be placed on and taken off the support member from one end. When the cutting operation is completed, the operator need merely slide base member 30 off the support member and the two components can then be placed in the tool box or moved readily to the next position on the pipe for use.

Referring again to FIG. 1, there is illustrated the use of an exchangeable or replaceable magnet 50 which is inserted into a magnet holding cavity 52 in the base member 10. This cavity may extend entirely through the base member so that the lower magnet surface is exposed and lies along the same plane as the lower base member surface. If such exposure is desired, the interior cavity sides may be slanted or shaped in such a way as to prevent the magnet from falling out of the cavity from the underside of the base member. An adhesive composition 54 may be used between the magnet and cavity sides to further secure the magnet therein. Any suitable adhesive composition may be used and preferably one which may be rather easily removed when magnet replacement is desired. The adhesive also preferably has thermal insulation properties to assist in protecting the magnet from heat transferred through the base member. The importance of the latter feature will be understood since repeated heating of the magnet will eventually destroy magnetic properties or reduce them to an ineffective state. Alternatively, the insulation may be in the form of a lining such as asbestos, rubber or the like and the magnet may simply rest against the insulation and be easily removed from the top of the base member.

It will be understood that the replaceable magnet may be of any shape so long as it will fit into the cavity and can be secured therein. Although the embodiment shown in FIG. 1 incorporates a cavity exposed at the upper base member surface, the cavity may be instead exposed from a side and again is preferably insulated. For example, asbestos, rubber, cork or similar material may be used to insulate the cavity and the magnet, if of suitable size can be forced into the insulated cavity so as to frictionally engage the insulation and yet be removed when replacement is required. The advantages of such a device and other embodiments within the purview of the invention will be evident to those skilled in the art.

I claim:
1. A device for guiding a cutting torch on a magnet attracting metal surface comprising:
   a magnetized base member, having a top surface having first means thereon for securing a guide member having a shaped surface for guiding said cutting torch, and a second means for holding a plurality of said guide members.
2. The device of claim 1 wherein said base member has a magnet incorporated therein.
3. The device of claim 2 wherein said base member has a magnet holding cavity therein and said magnet received in said cavity.
4. The device of claim 3 wherein said magnet is permanent and removable.

5. The device of claim 3 including a thermal insulation composition between said magnet and said base member.

6. The device of claim 1 wherein said base member comprises a flat metal plate having a magnet secured thereto.

7. The device of claim 6 wherein said magnet is embedded in said plate.

8. The device of claim 7 wherein said guide securing means is located adjacent an edge of said top surface.

9. The device of claim 8 wherein said first means comprises a threaded post and member threadedly engaging said post.

10. The device of claim 9 wherein said guide member includes a hole for engaging said post.

11. The device of claim 9 wherein said guide member includes a notched bracket for engaging said post.

12. In combination, the device of claim 1 and a support for holding said plate on a surface of revolution said support comprising a support member having a flat upper surface, a pair of opposite sides extending upwardly normal to said flat surface and a flange extending inwardly from each side toward the opposite side and spaced from said upper plate surface to form a pair of channels for receiving said base member, and a pair of rigid legs secured to said support member and extending downwardly therefrom said legs being substantially straight and having a 90° angle therebetween.

13. The combination of claim 12 wherein the support member comprises a magnet attracted metal.

* * * * *